(12) United States Patent
Ryu et al.

(10) Patent No.: US 11,777,158 B2
(45) Date of Patent: Oct. 3, 2023

(54) BATTERY MODULE AND BATTERY PACK INCLUDING SAME

(71) Applicant: LG CHEM, LTD., Seoul (KR)

(72) Inventors: Jae-Uk Ryu, Daejeon (KR); Dal-Mo Kang, Daejeon (KR); Min-Ho Kwon, Daejeon (KR); Su-Chang Kim, Daejeon (KR); Jeong-O Mun, Daejeon (KR); Jae-Min Yoo, Daejeon (KR); Ji-Su Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 117 days.

(21) Appl. No.: 16/620,198

(22) PCT Filed: Dec. 5, 2018

(86) PCT No.: PCT/KR2018/015343
§ 371 (c)(1),
(2) Date: Dec. 6, 2019

(87) PCT Pub. No.: WO2019/156324
PCT Pub. Date: Aug. 15, 2019

(65) Prior Publication Data
US 2020/0099114 A1 Mar. 26, 2020

(30) Foreign Application Priority Data
Feb. 6, 2018 (KR) ........................ 10-2018-0014621

(51) Int. Cl.
*H01M 10/647* (2014.01)
*H01M 10/658* (2014.01)
(Continued)

(52) U.S. Cl.
CPC ..... *H01M 10/647* (2015.04); *H01M 10/0525* (2013.01); *H01M 10/658* (2015.04);
(Continued)

(58) Field of Classification Search
CPC ............. H01M 10/658; H01M 10/647; H01M 10/0525; H01M 10/615; H01M 10/61;
(Continued)

(56) References Cited

U.S. PATENT DOCUMENTS 8,541,126 B2 * 9/2013 Hermann .............. H01M 10/66
429/120
8,557,431 B2 * 10/2013 Park .................... H01M 50/126
429/185
(Continued)

FOREIGN PATENT DOCUMENTS

CN 1783541 A 6/2006
CN 1024738880 A 5/2012
(Continued)

OTHER PUBLICATIONS

European Search Report for European Application No. 18904987.7 dated Oct. 14, 2020.
(Continued)

*Primary Examiner* — Matthew W Van Oudenaren
(74) *Attorney, Agent, or Firm* — Birch, Stewart, Kolasch & Birch, LLP (57) ABSTRACT

A battery module, which includes: a battery cell stack in which a plurality of battery cells are stacked; a flame spread prevention member configured to cover at least a portion of each battery cell; and a case configured to accommodate the battery cell stack covered by the flame spread prevention member.

12 Claims, 7 Drawing Sheets

(51) Int. Cl.
*H01M 10/0525* (2010.01)
*H01M 50/293* (2021.01)
*H01M 50/233* (2021.01)
*H01M 50/291* (2021.01)
*H01M 50/211* (2021.01)
*H01M 50/131* (2021.01)
*H01M 10/653* (2014.01)
*H01M 50/242* (2021.01)
*H01M 10/6551* (2014.01)
*H01M 50/24* (2021.01)
*H01M 50/209* (2021.01)
*H01M 10/6555* (2014.01)

(52) U.S. Cl.
CPC ....... *H01M 50/211* (2021.01); *H01M 50/233* (2021.01); *H01M 50/291* (2021.01); *H01M 50/293* (2021.01); *H01M 10/653* (2015.04); *H01M 10/6551* (2015.04); *H01M 10/6555* (2015.04); *H01M 50/131* (2021.01); *H01M 50/209* (2021.01); *H01M 50/24* (2021.01); *H01M 50/242* (2021.01); *H01M 2220/30* (2013.01)

(58) Field of Classification Search
CPC ............. H01M 10/613; H01M 10/617; H01M 10/653; H01M 10/6551; H01M 10/6555; H01M 50/211; H01M 50/233; H01M 50/209; H01M 50/24; H01M 50/242; H01M 2200/105; H01M 2200/106
See application file for complete search history.

(56) References Cited

U.S. PATENT DOCUMENTS

| | | | | |
|---|---|---|---|---|
| 10,763,467 | B2* | 9/2020 | Kim | .................... H01M 10/647 |
| 2006/0093899 | A1 | 5/2006 | Jeon et al. | |
| 2007/0281208 | A1 | 12/2007 | Yoon et al. | |
| 2010/0183910 | A1 | 7/2010 | Nishino et al. | |
| 2011/0195291 | A1 | 8/2011 | Yokoyama et al. | |
| 2012/0015226 | A1 | 1/2012 | Kim et al. | |
| 2012/0301777 | A1 | 11/2012 | Ahn | |
| 2014/0009527 | A1 | 4/2014 | Seong et al. | |
| 2014/0193685 | A1* | 7/2014 | Lim | .................... H01M 50/209 |
| | | | | 429/99 |
| 2014/0315073 | A1 | 10/2014 | Kim | |
| 2014/0356675 | A1 | 12/2014 | Lee et al. | |
| 2014/0370363 | A1 | 12/2014 | Oshiba et al. | |
| 2015/0194641 | A1 | 7/2015 | Tsuji et al. | |
| 2015/0318518 | A1* | 11/2015 | Kim | .................... H01M 50/121 |
| | | | | 429/176 |
| 2017/0018746 | A1 | 1/2017 | Kritzer et al. | |
| 2017/0098806 | A1 | 4/2017 | Bowersock et al. | |
| 2017/0214018 | A1 | 7/2017 | Sun et al. | |
| 2017/0294634 | A1 | 10/2017 | Choi | |
| 2018/0019508 | A1 | 1/2018 | Lee et al. | |
| 2018/0026242 | A1 | 1/2018 | Lee et al. | |
| 2018/0190952 | A1 | 7/2018 | Kim et al. | |
| 2018/0048160 | A1 | 8/2018 | Lee | |
| 2018/0309107 | A1* | 10/2018 | Widener | ............ H01M 50/446 |
| 2020/0035967 | A1 | 1/2020 | Yoon et al. | |

FOREIGN PATENT DOCUMENTS

| | | |
|---|---|---|
| CN | 104218193 A | 12/2014 |
| CN | 104285315 A | 1/2015 |
| CN | 205231129 U | 5/2016 |
| CN | 106025423 A | 10/2016 |
| CN | 106785225 * | 5/2017 |
| CN | 106785225 A | 5/2017 |
| CN | 107275715 A | 10/2017 |
| CN | 107425222 A | 12/2017 |
| CN | 206961920 U | 2/2018 |
| CN | 110495014 A | 11/2019 |
| EP | 2 280 436 A2 | 2/2011 |
| EP | 2 571 092 A1 | 3/2013 |
| EP | 3598564 A1 | 1/2020 |
| EP | 3 624 214 A1 | 3/2020 |
| JP | 5-266902 A | 10/1993 |
| JP | 2007-115437 A | 5/2007 |
| JP | 2008-59849 A | 3/2008 |
| JP | 2009-21223 A | 1/2009 |
| JP | 2011-49151 A | 3/2011 |
| JP | 2012-16875 A | 1/2012 |
| JP | 2012-33464 A | 2/2012 |
| JP | 2013-251127 A | 12/2013 |
| JP | 2015-2082 A | 1/2015 |
| JP | 2017-41437 A | 2/2017 |
| JP | 2018-195549 A | 12/2018 |
| KR | 10-2006-0084887 A | 7/2006 |
| KR | 10-2012-0132341 A | 12/2012 |
| KR | 10-2013-0062551 A | 6/2013 |
| KR | 10-2014-0008123 A | 1/2014 |
| KR | 10-2014-0141825 A | 12/2014 |
| KR | 10-2016-0053762 A | 5/2016 |
| KR | 10-2016-0125915 A | 11/2016 |
| KR | 10-1675621 B1 | 11/2016 |
| KR | 10-2017-0005117 A | 1/2017 |
| KR | 10-2017-0053110 A | 5/2017 |
| KR | 10-2017-0061582 A | 6/2017 |
| KR | 10-2017-0064245 A | 6/2017 |
| WO | WO 2010/143408 A1 | 12/2010 |
| WO | WO 2014/054633 A1 | 4/2014 |
| WO | WO-2017078306 A1 * | 5/2017 .......... H01M 10/647 |
| WO | WO 2017/110037 A1 | 6/2017 |

OTHER PUBLICATIONS

International Search Report (PCT/ISA/210) issued in PCT/KR2018/015343, dated Mar. 18, 2019.

* cited by examiner

BATTERY MODULE AND BATTERY PACK INCLUDING SAME

TECHNICAL FIELD

The present application claims priority to Korean Patent Application No. 10-2018-0014621 filed on Feb. 6, 2018 in the Republic of Korea, the disclosures of which are incorporated herein by reference.

The present disclosure relates to a battery module and a battery pack including the battery module, and more particular, to a battery module capable of preventing the flame generated at any one battery cell from spreading to other battery cells, and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

The lithium secondary battery is spotlighted due to its high operating voltage and very high energy density. However, since the lithium secondary battery uses an organic electrolyte, when being overcharged, the lithium secondary battery may cause overcurrent and overheating, which may lead to explosion or ignition in server cases.

Regarding the secondary battery, in case of a conventional battery module in which a plurality of battery cells are stacked, if any one battery cell explodes or ignites due to overcurrent and overheat, the flame spreads to other battery cells that operates normally, so that a plurality of battery cells explode in series. This may damage various devices equipped with the battery module, and a user may be exposed to the risk of a safety accident.

DISCLOSURE

Technical Problem

The present disclosure is directed to providing a battery module, which may prevent the flame generated at any one battery cell among a plurality of battery cells from spreading to other battery cells, and a battery pack including the battery module.

Also, the present disclosure is directed to providing a battery module, which may be easily manufactured due to a simple flame spread prevention structure, and a battery pack including the battery module.

Technical Solution

In one aspect of the present disclosure, there is provided a battery module, comprising: a battery cell stack in which a plurality of battery cells are stacked; a plurality of flame spread prevention members configured to cover at least a portion of a respective battery cell; and a case configured to accommodate the battery cell stack covered by the plurality of flame spread prevention members.

Also, the plurality of flame spread prevention members may each include a mica plate containing mica with both heat insulation and heat resistance.

In addition, a hollow may be formed in each of the plurality of flame spread prevention members so that each battery cell is inserted into a respective one of the plurality of flame spread prevention members.

Also, each of the battery cells may be a pouch-type battery cell having a section of a rectangular shape, and the flame spread prevention member may have a hexahedral shape.

In addition, each of the battery cells may be a pouch-type battery cell having a section of a rectangular shape, and the flame spread prevention member may be provided to cover two walls of the pouch-type battery cell.

Also, each of the plurality of flame spread prevention members may include a first cover unit configured to cover a first wall of one of the pouch-type battery cells; and a second cover unit bent from the first cover unit to cover a second wall of one of the pouch-type battery cells.

In addition, the battery module may further comprise a frame coupled to the case and having a Plurality of insert grooves formed with a preset interval, wherein each of the plurality of flame spread prevention members may be slidably coupled to one of the insert grooves of the frame, and each of the battery cells may be interposed between the flame spread prevention members adjacent to each other.

Also, the frame may be provided in a pair, the pair of frames may be respectively coupled to an upper side and a lower side of the case so that the plurality of insert grooves thereof face each other, and both ends of each of the plurality of flame spread prevention members may be respectively inserted into the plurality of insert grooves of the pair of fames.

In addition, the frame may include a mica plate containing mica with both heat insulation and heat resistance.

Meanwhile, in another aspect of the present disclosure, there is also provided a battery pack, which comprises the battery module described above.

Advantageous Effects

According to embodiment of the present disclosure, since the flame spread prevention member covers at least a portion of a plurality of battery cells, even though explosion or fire occurs at any one battery cell among the plurality of battery cells, it is possible to prevent the flame from spreading to other battery cells.

In addition, since a flame spread prevention member made of mica having both heat insulation and heat resistance is formed to simplify the flame spread prevention structure, the battery module may be manufactured easily.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 1:
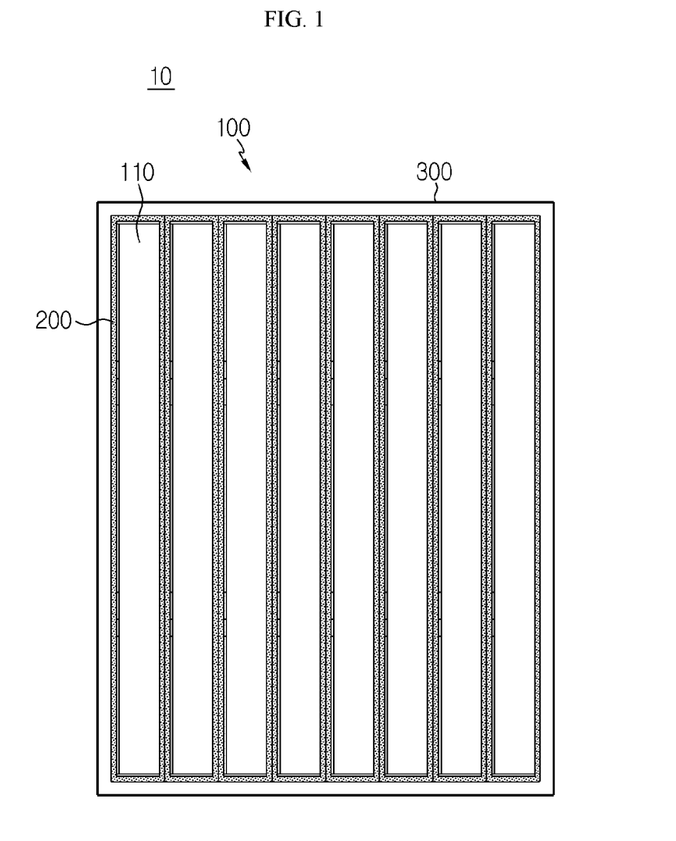
FIG. 1 is a cross-sectioned view showing a battery module according to the first embodiment of the present disclosure.
Figure 2:
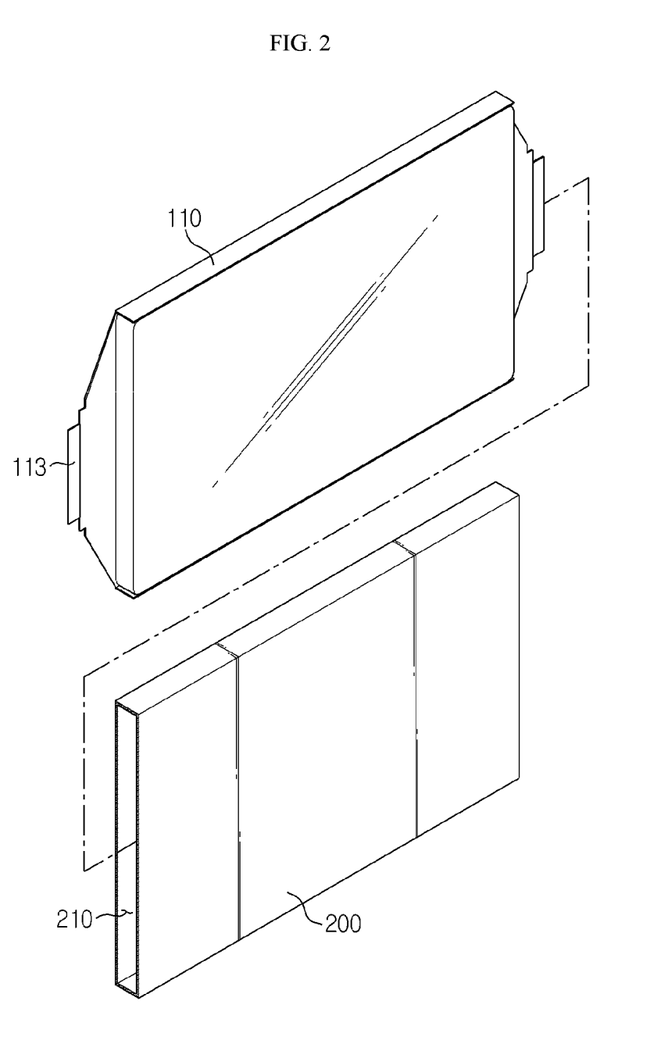
FIG. 2 is a perspective view showing the battery module according to the first embodiment of the present disclosure, from which a flame spread prevention member and a battery cell are exploded.
Figure 3:
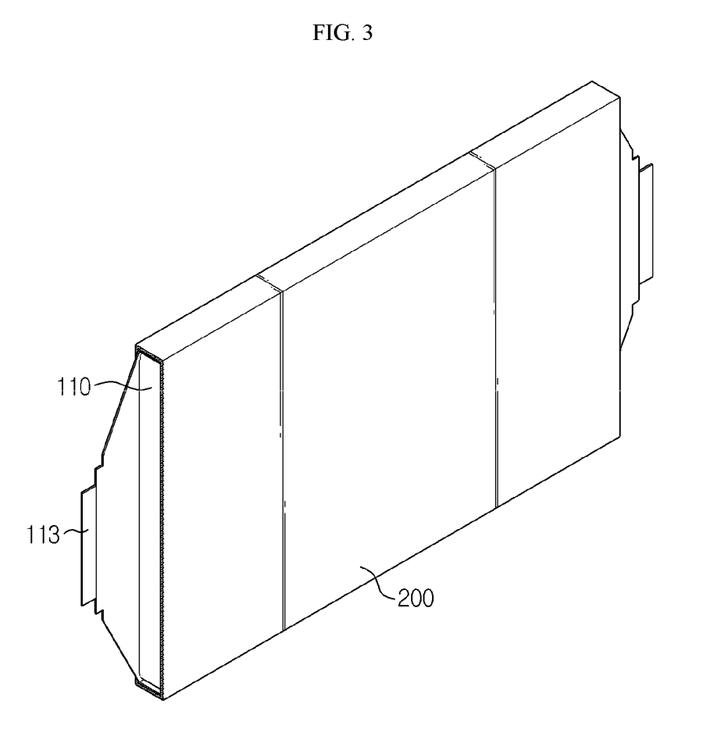
FIG. 3 is a schematic perspective view showing the battery module according to the first embodiment of the present disclosure, in which an individual battery cell is covered by the flame spread prevention member.

FIG. 1 is a cross-sectioned view showing a battery module according to the first embodiment of the present disclosure, FIG. 2 is a perspective view showing the battery module according to the first embodiment of the present disclosure, from which a flame spread prevention member and a battery cell are exploded, and FIG. 3 is a schematic perspective view showing the battery module according to the first embodiment of the present disclosure, in which an individual battery cell is covered by the flame spread prevention member.

Referring to FIGS. 1 to 3, a battery module 10 according to the first embodiment of the present disclosure includes a battery cell stack 100, a flame spread prevention member 200, and a case 300.

The battery cell stack 100 includes a plurality of stacked battery cells 110. The battery cell 110 may have various structures, and the plurality of battery cells 110 may be stacked in various ways. The battery cell 110 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity. The battery cell 110 may include an electrode lead 113. The electrode lead 113 is a kind of terminal exposed to the outside and connected to an external device and may be made of a conductive material. The electrode lead 113 may include a positive electrode lead and a negative electrode lead. The positive electrode lead and the negative electrode lead may be disposed at opposite sides of the battery cell 110 in the longitudinal direction, or the positive electrode lead and the negative electrode lead may be disposed at the same side the battery cell 110 in the longitudinal direction.

The flame spread prevention member 200 individually covers at least a portion of each of the plurality of battery cells 110. Here, although the flame spread prevention member 200 may contact the battery cell 110 in order to cover the battery cell 110, the flame spread prevention member 200 may cover the battery cell 110 in a state of being spaced apart from the battery cell 110 by a predetermined interval. In this case, the flame spread prevention member 200 may be supported by the case 300. Meanwhile, in the first embodiment of the present disclosure, as shown in FIGS. 1 and 3, it is described that the flame spread prevention member 200 surrounds all side surfaces of the individual battery cell 110 except side surfaces where the electrode lead 113 is formed, namely all of four side surfaces of the battery cell 110 except the side surfaces where the electrode lead 113 is formed, but the present disclosure is not limited thereto. In another embodiment, for example, if the battery cell 110 has a substantially hexahedral shape, the flame spread prevention member 200 may be provided to surround only three surfaces among the four surfaces of the battery cell 110 except for the surfaces where the electrode lead 113 is formed.

The flame spread prevention member 200 may be provided as a mica plate containing mica with both heat insulation and heat resistance. Here, the mica plate may have not only a flat mica plate shape but also a mixture of planar and curved surfaces. In addition, as shown in FIG. 2, the flame spread prevention member 200 may be formed in a hexahedron shape in which four mica plates are coupled to form a hollow 210 therein. Here, the four mica plates may be integrally formed, or the four mica plates may be prepared separately and then coupled to each other. However, the number and shape of the mica plates are not limited to the above. For example, if the battery cell 110 is a pouch-type battery cell 110 having a section of a rectangular shape, the flame spread prevention member 200 may be formed in a hexahedral shape having a hollow 210 formed therein, and as shown in FIG. 2, the pouch-type battery cell 110 may be inserted into and placed in the hollow 210 of the flame spread prevention member 200. Here, if the flame spreading prevention member 200 is made of a mica with having heat insulation and heat resistance, even if an explosion or ignition occurs in any one battery cell 110, the flame may be blocked by the mica plate and prevented from spreading to other battery cells 110. That is, referring to FIG. 1, since all of the plurality of battery cells 110 are individually covered by the flame spread prevention members 200, respectively, even if an ignition occurs in any of the battery cells 110, it is possible to prevent the flame from spreading, and so it is possible to prevent the flame from causing a larger fire. Meanwhile, the flame spread prevention member 200 is formed of a thin mica plate that is lighter than aluminum, which facilitates the fabrication and simplifies the structure. However, the material of the flame spread prevention member 200 is not necessarily limited to the mica plate containing mica, and various known materials may be used as long as they are capable of being formed into a thin plate shape and have heat resistance and heat insulation.

The case 300 accommodates the battery cell stack 100 covered by the flame spread prevention member 200. The case 300 surrounds the battery cells 110, thereby protecting the battery cells 110 from external vibration or shock. The case 300 may be formed in a shape corresponding to the shape of the battery cell stack 100. For example, if the battery cell 110 or the battery cell stack 100 has a hexahedron shape with a section of a rectangular shape, the case 300 may also have a hexahedron shape corresponding thereto. The case 300 can be manufactured, for example, by bending a plate made of metal, and thus the case 300 may be manufactured in an integrated form. If the case 300 is manufactured in an integrated form, the coupling process is simplified. Alternatively, the case 300 may be prepared as separated parts, which are coupled to each other by welding or the like.

Hereinafter, the operation and effect of the battery module 10 according to the first embodiment of the present disclosure will be described with reference to the drawings.

Referring to FIGS. 1 to 3, the battery cell 110 may be formed in a substantially hexahedral shape, and the flame spread prevention member 200 formed of an mica plate may be provided to surround four surfaces of the battery cell 110 except two surfaces where the electrode lead 113 is formed. That is, one flame spread prevention member 200 surrounds one of the plurality of battery cells 110, and the plurality of flame spread prevention members 200 may respectively cover the battery cells 110 in this manner. In addition, the battery cell stack 100 covered by the flame spread prevention members 200 is accommodated in the case 300.

In this way, according to the first embodiment of the present disclosure, since the flame spread prevention members 200 cover all of the plurality of battery cells 110, respectively, even though explosion or ignition occurs in any one of the plurality of battery cells 110, it is possible to prevent the flame from spreading to other battery cells 110.

Figure 4:
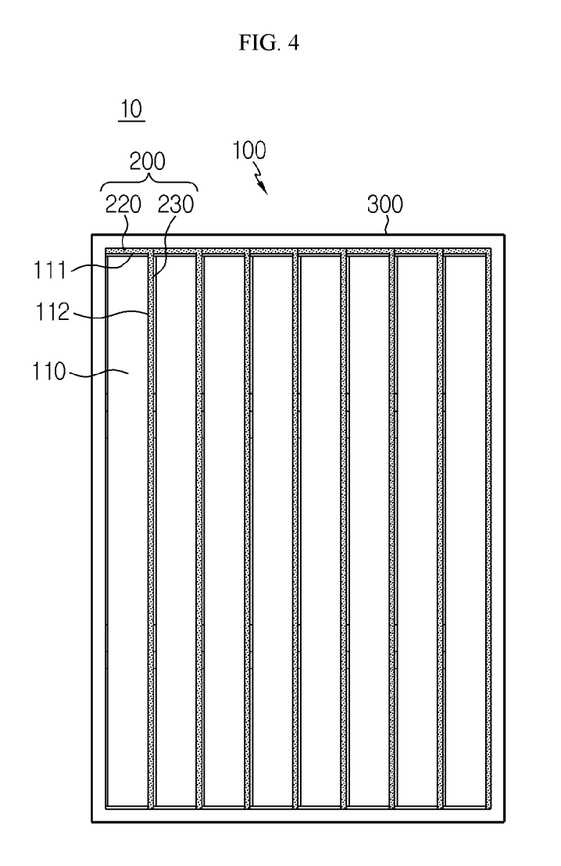
FIG. 4 is a cross-sectioned view showing a battery module according to the second embodiment of the present disclosure.
Figure 5:
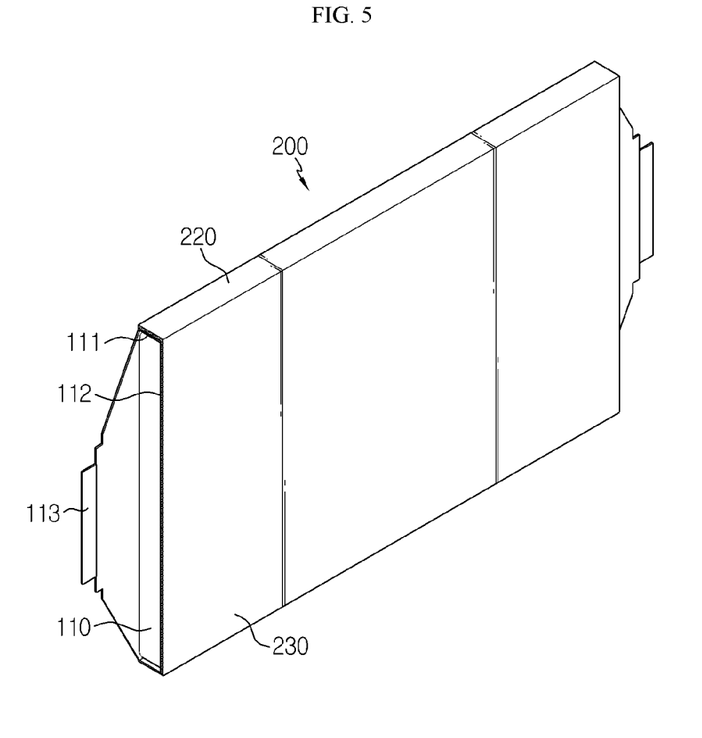
FIG. 5 is a schematic perspective view showing the battery module according to the second embodiment of the present disclosure, in which an individual battery cell is covered by the flame spread prevention member.

FIG. 4 is a cross-sectioned view showing a battery module according to the second embodiment of the present disclosure, and FIG. 5 is a schematic perspective view showing the battery module according to the second embodiment of the present disclosure, in which an individual battery cell is covered by the flame spread prevention member.

Hereinafter, the operations and effects of the battery module 10 according to the second embodiment of the present disclosure will be described with reference to the accompanying drawings. Here, a feature already explained in relation to the battery module 10 according to the first disclosure of the present disclosure will not be described in detail again.

The second embodiment of the present disclosure is different from the first embodiment where the flame spread prevention member 200 covers the battery cell 110 entirely, in the point that the flame spread prevention member 200 covers the battery cell 110 just partially.

Referring to FIGS. 4 and 5, in the second embodiment of the present disclosure, the battery cell 110 is a pouch-type battery cell 110 having a section of a rectangular shape, and the flame spread prevention member 200 is formed substantially in a "¬," shape to cover two walls 111, 112 of the battery cell 110, namely to surround the two walls 111, 112. Here, the flame spread prevention member 200 may contact any two walls 111, 112 of the battery cell 110, or the flame spread prevention member 200 may be supported by the case 300 to be spaced from the walls 111, 112 of the battery cell 110 by a predetermined interval.

The flame spread prevention member 200 may include a first cover unit 220 and a second cover unit 230. The first cover unit 220 covers the first wall 111 of the pouch-type battery cell 110, and the second cover unit 230 is bent from the first cover unit 220 to cover the second wall 112 of the pouch-type battery cell 110. Accordingly, the flame spread prevention member 200 may be formed substantially in a "¬," shape to cover two walls 111, 112 of the battery cell 110, and even though explosion or ignition occurs in any one of the plurality of battery cells 110, it is possible to prevent the flame from spreading to other battery cells 110.

Figure 6:
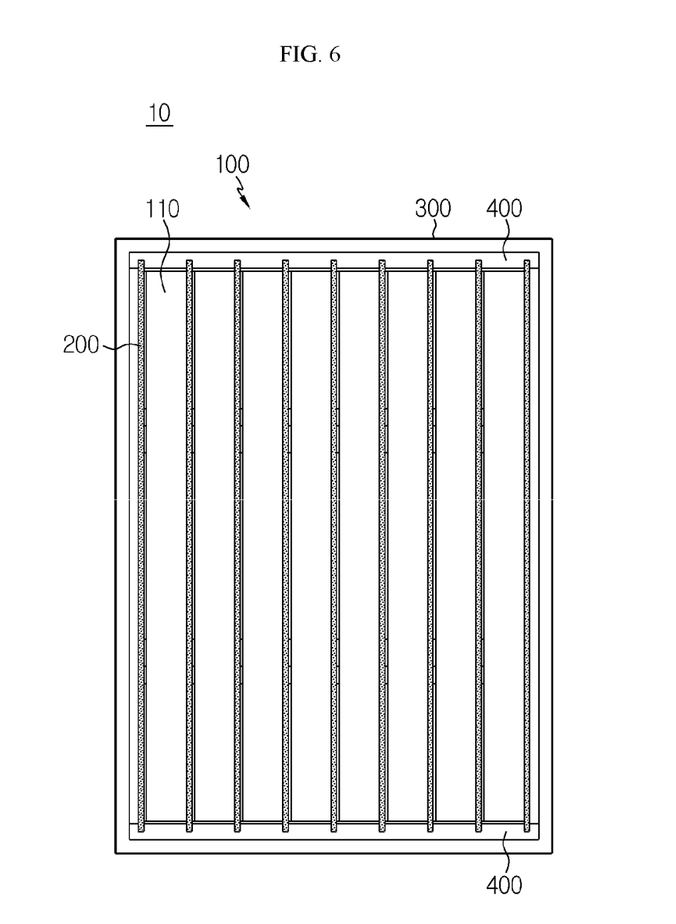
FIG. 6 is a cross-sectioned view showing a battery module according to the third embodiment of the present disclosure.
Figure 7:
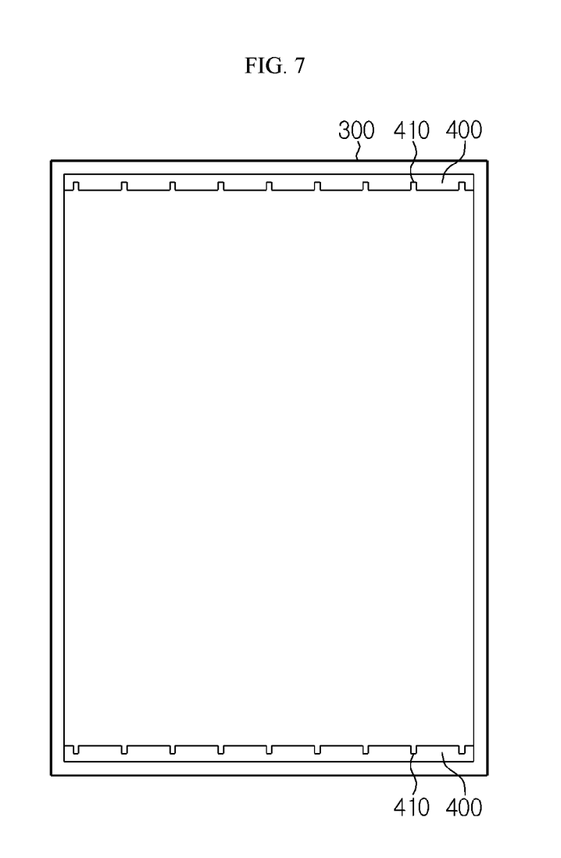
FIG. 7 is a cross-sectioned view showing the battery module according to the third embodiment of the present disclosure, in which a pair of frames are coupled to an upper side and a lower side of the case.

FIG. 6 is a cross-sectioned view showing a battery module according to the third embodiment of the present disclosure, and FIG. 7 is a cross-sectioned view showing the battery module according to the third embodiment of the present disclosure, in which a pair of frames are coupled to an upper side and a lower side of the case.

Hereinafter, the operations and effects of the battery module 10 according to the third embodiment of the present disclosure will be described with reference to the accompanying drawings. Here, a feature already explained in relation to the battery module 10 according to the first and second embodiments of the present disclosure will not be described in detail again.

The third embodiment of the present disclosure is different from the first embodiment and the second embodiment, in the point that a frame 400 is provided and the flame spread prevention member 200 is inserted into the frame 400.

Referring to FIGS. 6 and 7, the frame 400 is coupled to the case 300. For example, referring to FIG. 7, if the frame 400 is provided in a pair, the pair of frames 400 may be coupled to an upper side and a lower side of the case 300, respectively, based on FIG. 7 so that the insert grooves 410 of the pair of frames 400 face each other, but the present disclosure is not limited thereto. The frame 400 has a plurality of insert grooves 410 formed at preset intervals. Here, the plurality of insert grooves 410 may be formed in the frame 400 to have the same interval, but the present disclosure is not necessarily limited to the same interval. Referring to FIG. 6, the flame spread prevention member 200 may be formed to have an approximately "1" shape. Both ends of the flame spread prevention member 200 having the "1" shape are inserted into the insert grooves 410 of the pair of frames 400 respectively coupled to the upper side and the lower side of the case 300, and the flame spread prevention member 200 having the "1" shape may be coupled to the pair of frames 400. In addition, if a plurality of flame spread prevention members 200 having the "1"

shape are coupled to the frame 400 to have a preset interval, the battery cell 110 is interposed between the "1"-shape flame spread prevention members 200 adjacent to each other. Here, the "1"-shaped flame spread prevention member 200 may be formed of a mica plate containing mica with both heat insulation and heat resistance, and the frame 400 may also be formed of a mica plate containing mica with both heat insulation and heat resistance.

In this way, the flame spread prevention member 200 may cover the plurality of battery cells 110, respectively, and even if explosion or ignition occurs in any one battery cell 110 among the plurality of battery cells 110, it is possible to prevent the flame from spreading to other battery cells 110.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a housing for accommodating the battery modules 10, and various devices for controlling charge and discharge of the battery modules 10, such as a BMS, a current sensor, a fuse, and the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module and a battery pack including the battery module and is particularly applicable to an industry related to a secondary battery.

What is claimed is:

1. A battery module, comprising:
a battery cell stack in which a plurality of battery cells are stacked in a first direction along a length of the battery cell stack, each battery cell of the plurality of battery cells having a cross sectional shape and a length extending in a second direction, the length of each battery cell being equal to a width of the battery cell stack in the second direction;
a plurality of flame spread prevention members, each of the plurality of flame spread prevention members comprising a first side wall extending in a second direction and configured to contact a first side of a respective one of the plurality of battery cells; and
a case configured to accommodate the battery cell stack covered by the plurality of flame spread prevention members,
wherein a plurality of hollows is formed by the plurality of flame spread prevention members so that each of the plurality of battery cells is inserted into a respective one of the plurality of hollows,
wherein a cross sectional shape of the plurality of hollows is the same as a cross sectional shape of the respective one of the plurality of battery cells,
wherein each of the plurality of flame spread prevention members includes a second side wall extending from the first side wall to cover a second wall of a respective one of the plurality of battery cells, and
wherein each of the plurality of battery cells is a pouch-type battery cell having a rectangular shape, and each of the plurality of flame spread prevention members has a hexahedral shape with two open ends.

2. The battery module according to claim 1, wherein the plurality of flame spread prevention members each include a mica plate containing mica with both heat insulation and heat resistance.

3. A battery module, comprising:
a battery cell stack in which a plurality of battery cells are stacked in a first direction along a length of the battery cell stack, each battery cell of the plurality of battery cells having a cross sectional shape and a length, the length of each battery cell being equal to a width of the battery cell stack;
a plurality of flame spread prevention members, each of the plurality of flame spread prevention members comprising a first side wall extending in a second direction and configured to contact a first side of a respective one of the plurality of battery cells; and
a case configured to accommodate the battery cell stack covered by the plurality of flame spread prevention members,
a frame coupled to the case and having a plurality of insert grooves formed in opposite inner surfaces of the frame with a preset interval,
wherein a plurality of hollows is formed by the plurality of flame spread prevention members so that each of the plurality of battery cells is inserted into a respective one of the plurality of hollows,
wherein a cross sectional shape of the plurality of hollows is the same as a cross sectional shape of the respective one of the plurality of battery cells,
wherein each first side wall of the plurality of flame spread prevention members is slidably coupled to one of the plurality of insert grooves of the frame, and each of the plurality of battery cells is interposed between flame spread prevention members adjacent to each other, and
wherein a length of the plurality of flame spread prevention members in the second direction is greater than a distance between the opposite inner surfaces of the frame and greater than a length of the plurality of battery cells in the second direction.

4. The battery module according to claim 3, wherein the frame is provided in a pair, the pair of frames are respectively coupled to an upper side and a lower side of the case so that the plurality of insert grooves thereof face each other, and both ends of each first side wall of the plurality of flame spread prevention members are respectively inserted into the plurality of insert grooves of the pair of frames.

5. The battery module according to claim 3, wherein the frame includes a mica plate containing mica with both heat insulation and heat resistance.

6. A battery pack, comprising a battery module defined in claim 1.

7. The battery module according to claim 1, wherein each of the plurality of flame spread prevention members includes a mica plate.

8. The battery module according to claim 1, wherein the first side wall is planar.

9. A battery module, comprising:
a battery cell stack in which a plurality of battery cells are stacked in a first direction along a length of the battery cell stack, each battery cell of the plurality of battery cells having a cross sectional shape and a length extending in a second direction, the length of each battery cell being equal to a width of the battery cell stack in the second direction;
a plurality of flame spread prevention members, each of the plurality of flame spread prevention members comprising a first side wall extending in a second direction and configured to contact a first side of a respective one of the plurality of battery cells; and a case configured to accommodate the battery cell stack covered by the plurality of flame spread prevention members, wherein a plurality of hollows is formed by the plurality of flame spread prevention members so that each of the plurality of battery cells is inserted into a respective one of the plurality of hollows, wherein a cross sectional shape of the plurality of hollows is the same as a cross sectional shape of the respective one of the plurality of battery cells, wherein each of the plurality of flame spread prevention members includes a second side wall extending from the first side wall to cover a second wall of a respective one of the plurality of battery cells, and wherein each of the plurality of flame spread prevention members is L-shaped.

10. The battery module according to claim 9, wherein each L-shaped flame spread prevention member directly contacts a top wall of a respective one of the plurality of battery cells.

11. The battery module according to claim 1, wherein the first side wall extends from a bottom wall of the case to a top wall of the case.

12. The battery module according to claim 1, wherein the second side wall directly contacts a top wall of a respective one of the plurality of battery cells, the top wall connected to the first side wall at an edge of the respective one of the plurality of battery cells.

* * * * *